Dec. 30, 1941.    C. V. McGUIRE    2,268,049
METHOD OF MAKING COMPOSITE MATERIAL
Original Filed Feb. 12, 1936
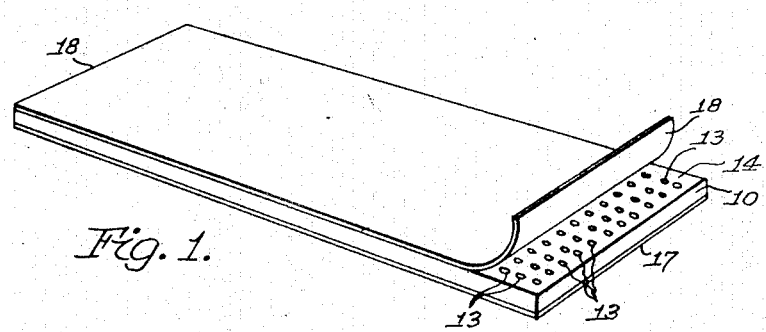
Fig. 1.
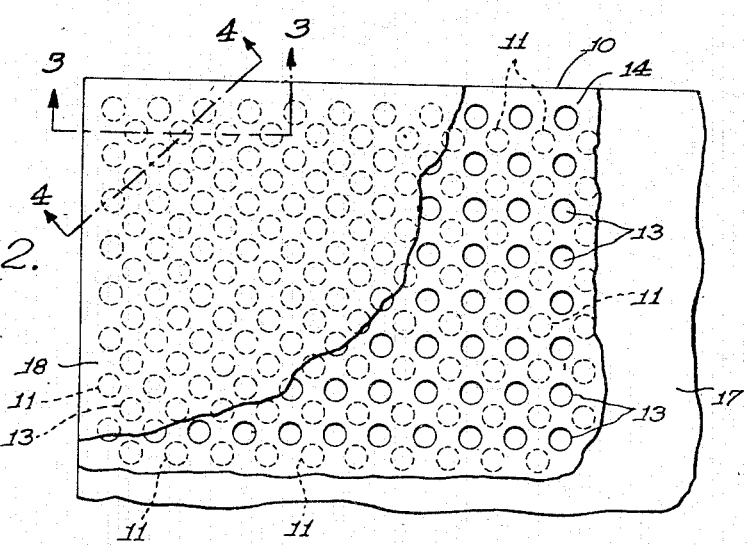
Fig. 2.
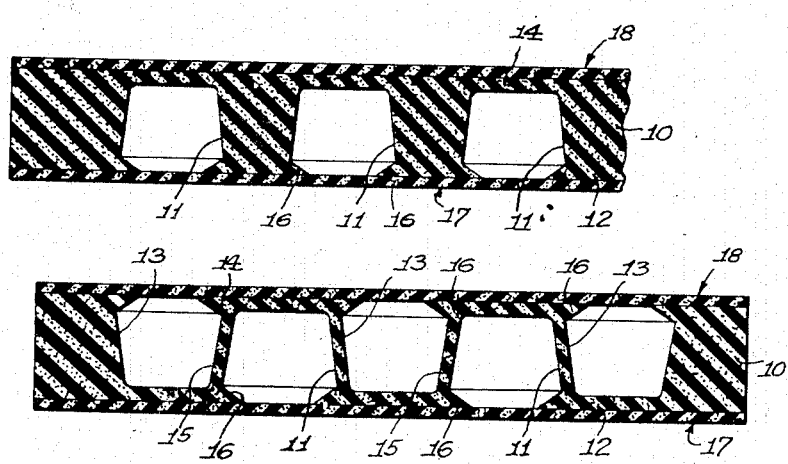
Fig. 3.
Fig. 4.
Inventor
Clarence V. McGuire
By
Attorney Patented Dec. 30, 1941

2,268,049

UNITED STATES PATENT OFFICE 2,268,049

METHOD OF MAKING COMPOSITE MATERIAL

Clarence V. McGuire, Grosse Pointe Park, Mich., assignor to Airfilm Corporation, Detroit, Mich., a corporation of Michigan Original application February 12, 1936, Serial No. 63,487. Divided and this application September 5, 1939, Serial No. 293,435

2 Claims. (Cl. 154—40)

The present invention relates to a method of making a rubber, composite, pneumatic material of general utility, but especially adapted for shoe soles, and is a division of my application, Serial No. 63,487, filed February 12, 1936 (now Patent No. 2,189,813).

It is an object of this invention to provide a method of making a composite material of an unusually flexible nature and including sealed air pockets.

It is a further object to provide a method of making such a material wherein the sealed air pockets cover substantially the entire body of the material and are so shaped that a load supported on the material is supported almost entirely on air.

A further object is to provide a method of making a material of this kind having a series of pockets therein open at the surface of the material, and the openings to said pockets being permanently sealed over by flexible material.

A further object is to provide a convenient method of manufacturing the composite product, including an easy way of expanding the outer sealing material for application to the body material so that ultimately said sealing material will be under tension.

It is a further object of the invention to design a method of making the pneumatic material so as to provide the maximum, practical sealing surface on the base material onto which surface the flexible material may be adhesively united.

In the drawing:

Fig. 1 is a perspective view of a section of the composite material with a portion of one of the sealing sheets or dams turned up to disclose the inner construction;

Fig. 2 is a segmental plan view of a portion of the composite material with the different layers thereof successively broken away to show the construction;

Fig. 3 is a section on the line 3—3 of Fig. 2, and

Fig. 4 is a section on the line 4—4 of Fig. 2.

Referring to the drawing, 10 indicates a section of flexible body material having pockets 11 extending inwardly from one surface 12 of said material and being open at said surface. Interspaced with respect to the pockets 11 are pockets 13 extending inwardly from and being open at the opposite surface 14 of the body material 10. It will be observed in Fig. 2 that pockets 11 and 13 are so interspaced that substantially the entire area of the body material 10 is filled with pockets. It will be further observed in Fig. 4 that the walls 15 between adjacent pockets are not vertical but slope so that they have less resistance to a force applied vertically on the material 10. The openings of the pockets 11 and 13 are formed with overhanging rims 16.

Over the bottom surface 12 of the body material 10 is located a resilient sealing sheet or dam 17 adhesively united thereto by the method hereafter disclosed. This sheet 17, after the composite material is completed, will be under tension. Similarly, a resilient sealing sheet or dam 18 is applied over and adhesively united to the surface 14. The dams 17 and 18 enclose air in the pockets 11 and 13 and provide pneumatic air cells.

The rims or flanges 16 overhang their respective pockets and increase the surface area to which the dams 17 and 18 are applied without substantially reducing the volume of the pockets or decreasing the flexibility of the material. By thus increasing the area of adhesion, the possibility of separation of the dams from the body material is greatly reduced.

In order to apply the dams 17 and 18 in such wise that they will be under tension, a convenient method has been devised. In the first place, the dams, as selected, are substantially less extensive in area than the body material 10. They are then dipped in gasoline for a short period. The dams, being of rubber, when immersed, will expand, presumably by the absorption of gasoline. After they have been in the gasoline for a sufficient length of time, so that they will have expanded to the surface dimensions of the body material, they are removed therefrom and the surplus gasoline is shaken off. The expanded dams are then placed over the body material 10, which has had its surfaces 12 and 14 coated with a suitable cement, and, by rolling or otherwise, are forced against said surfaces to become tightly bonded thereto by said cement.

In a very short while, the gasoline absorbed by the dams evaporates, whence the dams seek to return to their original shapes or dimensions. As they are prevented from so returning by their being cemented to the body material 10, they will be held under tension and will remain so. It will be observed that, at the time the cement is still plastic, very little tension is present in the dams. As the gasoline continues to evaporate, the tension increases, but simultaneously the cement becomes harder.

The advantages of having the dams under tension are several. In the first place, a better adherence of the dams to the body material is obtained, and there is less likelihood of entraining air bubbles between the dams and the adhesion surfaces of the body material. It is well known that such bubbles tend to spread and ultimately to destroy the union between the materials. Furthermore, with the sealing dams under tension, when the body material 10 is deflected by application of a load thereto, as soon as the load is removed the dams immediately seek their original positions and will always restore the body material to its original shape, thus minimizing the tendency of the body material to assume a permanent deformation because of fatigue. It may be seen that the dams, in this action, cause the load, although applied to a particular locality, to be distributed, to some extent, over a much larger area of the body material. Furthermore, even if a certain amount of permanent deformation should occur, there will always be some remaining tension in the dams sufficient at least for partial preservation of the advantages above set forth.

Preferably, the dams are made of light material, since more flexibility results, and also better adherence is obtained by having at least one of the materials being united of flexible characteristics so as to follow the deformations of the other during the cementing operation. This adds to the advantages of having the dams initially under tension since, being light, they have greater tendency to stretch under the air pressure within the cells when compression load is applied. If they are originally under tension, permanent deformation to such an extent that they bulge from the surface of the material is less likely to result.

In connection with the application of the dams, an additional important result obtains from having the dams under tension. Necessarily, a certain amount of pressure is applied in cementing the dams to the body material. This pressure causes at least some of the cells to be collapsed, particularly where the sheets are passed between rollers. This collapsing of the cells may be regular or irregular, according to the process employed, but, in any case, it deforms the cementing surface of the material.

Some of the cells thus collapsed do not of their own accord return to original shape. If this condition were not remedied, the resulting material would be valueless. However, by the present method, these collapsed cells are returned to shape. The tension occurring in the dams as they dry causes the dams to draw out these collapsed cells to their original shapes, since the tendency of the unit, being under tension, is to become planar.

Furthermore, this deformation of the cells, as noted, causes deformation of the cementing surfaces of the body material about the cell outlets. If the dams are not under tension, this deformation will cause wrinkles and puckers in the dams when the cells return to their normal shapes. As the present material dries, the tension occurs, and this tension removes any such wrinkles or puckers.

Among further advantages of the method herein described, for applying the dams to the body material, is that of a more uniform, equally distributed expansion throughout the sheet. Consequently, when the final contraction takes place, this also will be uniform and the tension of the sheet resulting will be substantially uniform over the surfaces thereof. In other words, each air pocket will be covered by a tension seal, the tension of which will be equal to that of all the other seals over the remaining pockets. The great difficulties that are encountered in attempting to apply dams of this kind to the body material by mechanical stretching are apparent. In the present process the dams are brought uniformly within close limits of the exact size of the body material, with consequent reduction of loss of material. Also, after the initial press operation, it is unnecessary to hold the dams until the cement sets, since, as heretofore noted, the contraction of the dams will occur more or less in proportion to the hardening of the cement. Furthermore, the present method is extremely simple and easy to perform.

What I claim is:

1. A method of making pneumatic rubber material including the steps of preparing a relatively thick, flexible base element having pockets extending inwardly from one surface thereof, expanding a smaller, relatively thin, rubber sealing element by immersion in gasoline until it is substantially the same size as said base element, cementing the thus expanded sealing element to the base element to seal said pockets and form air cells, whereby, upon evaporation of said gasoline from said sealing element, the latter will be normally under tension.

2. The method of making insole material including the steps of preparing a flexible rubber body element of suitable size, said element having pockets extending inwardly from both surfaces thereof, expanding two smaller thin sheets of rubber by absorption of gasoline thereby, cementing said sheets while thus expanded to said two surfaces to enclose said pockets to form pneumatic cells, the gasoline evaporating thereafter to leave the sheets under tension.

CLARENCE V. McGUIRE.